United States Patent
Lin

(10) Patent No.: US 8,452,983 B2
(45) Date of Patent: May 28, 2013

(54) SYSTEM AND METHOD FOR PROTECTING NUMERICAL CONTROL CODES

(75) Inventor: Gen Lin, La Palma, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1103 days.

(21) Appl. No.: 12/052,162

(22) Filed: Mar. 20, 2008

(65) Prior Publication Data

US 2008/0294910 A1 Nov. 27, 2008

Related U.S. Application Data

(60) Provisional application No. 60/896,709, filed on Mar. 23, 2007.

(51) Int. Cl.
*G06F 11/30* (2006.01)
(52) U.S. Cl.
USPC ........... 713/190; 713/189; 713/191; 713/192; 713/193; 713/194
(58) Field of Classification Search
USPC .................................. 713/189–194
See application file for complete search history.

(56) References Cited

U.S. PATENT DOCUMENTS

| | | | |
|---|---|---|---|
| 3,496,547 A * | 2/1970 | Gorrill et al. ................... 358/1.5 |
| 5,193,115 A * | 3/1993 | Vobach ........................... 380/46 |
| 5,898,590 A * | 4/1999 | Wampler et al. .............. 700/174 |
| 5,982,891 A | 11/1999 | Ginter |
| 6,112,133 A | 8/2000 | Fishman |
| 6,499,035 B1 * | 12/2002 | Sobeski ................................ 1/1 |
| 6,868,495 B1 * | 3/2005 | Glover ........................... 713/190 |
| 7,016,493 B2 * | 3/2006 | Henson et al. ................... 380/44 |
| 7,757,097 B2 * | 7/2010 | Atallah et al. ................ 713/187 |
| 2002/0124177 A1 * | 9/2002 | Harper et al. ................. 713/189 |
| 2003/0028801 A1 * | 2/2003 | Liberman et al. ............. 713/200 |
| 2003/0125824 A1 * | 7/2003 | Pavlik ............................. 700/96 |
| 2003/0125975 A1 * | 7/2003 | Danz et al. ........................ 705/1 |
| 2003/0136841 A1 * | 7/2003 | Alleshouse .............. 235/462.01 |
| 2004/0196483 A1 * | 10/2004 | Jacobsen ...................... 358/1.13 |
| 2006/0064385 A1 * | 3/2006 | Susnjara ......................... 705/59 |
| 2007/0013930 A1 * | 1/2007 | Emerson et al. ............. 358/1.13 |
| 2007/0136818 A1 * | 6/2007 | Blumberg et al. .............. 726/27 |
| 2007/0225856 A1 * | 9/2007 | Slaughter et al. ............. 700/187 |
| 2010/0001069 A1 * | 1/2010 | Silverbrook et al. ......... 235/385 |
| 2010/0020968 A1 * | 1/2010 | Jin et al. ....................... 380/200 |

OTHER PUBLICATIONS

"Compiler Construction with ANTLR and Java" by Gary L. Schaps; Mar. 1, 1999; 11 pages; originally downloaded from http://www.drdobbs.com/windows/184410884.*

"Exploring Java—1.2 A Virtual Machine" by Patrick Niemeyer & Joshua Peck; Jul. 1997; 1 page; originally downloaded from http://docstore.mik.ua/orelly/java/exp/ch01_02.htm.*

(Continued)

*Primary Examiner* — Carl Colin
*Assistant Examiner* — Don Zhao

(57) ABSTRACT

A system, method, and computer program for protecting numerical control codes, comprising decrypting an encrypted text file that defines how an event for a tool path data set is processed; processing said decrypted text file to obtain a set of instructions; formatting said set of instructions according to a definition file; and outputting said set of formatted instructions; whereby postprocessed machine controls are written and appropriate means and computer-readable instructions.

19 Claims, 4 Drawing Sheets

OTHER PUBLICATIONS

"Cracking Java byte-code encryption" by Vladimir Roubtsov; May 9, 2003; 9 pages; originally downloaded from http://www.javaworld.com/javaqa/2003-05/01-qa-0509-jcrypt.html.*

"Write text parsers with yacc and lex" by Martin Brown; May 31, 2006; 27 pages; originally downloaded from http://www.ibm.com/developerworks/aix/tutorials/au-lexyacc/au-lexyacc-pdf.pdf.*

"Modela 3D Plotter MDX-15 MDX-20 User's Manual" by Roland DG Corporation (2000); 72 pages; originally downloaded from http://support.rolanddga.com/docs/Documents/departments/Technical%20Services/Manuals%20and%20Guides/MDX-20-15_USE_ENGLISH_R5.pdf.*

"Building a cnc router with an old printer and old scanner" by codemaster et al. (Dec. 18, 2005); 4 pages;originally downloaded from http://www.cnczone.com/forums/open_source_cnc_machine_designs/15733-building_cnc_router_old_printer.html.*

"CNC vs. 3D Printing vs. Laser-cutting" by Jeffrey McGrew (Aug. 1, 2006); 2 pages; originally downloaded from http://www.becausewecan.org/node/216.*

"An XML-based Scripting Language for Chain-type Modular Robotic Systems" by Ying Zhang et al. (2004); 10 pages; originally downloaded from http://www.cs.princeton.edu/~agolovin/papers/ias08.pdf (via http://citeseerx.ist.psu.edu/).*

"JSP 1.2: Great news for the JSP Community, Part 1" by Hans Bergsten (Oct. 10, 2001); 8 pages; originally downloaded from http://onjava.com/pub/a/onjava/2001/10/10/jsp.html.*

"The U.S. Patent & Trademark Office Issues Vertical Computer Systems a Patent Covering Various Aspects of the XML Enabler Agent" by Vertical Computer Systems, Inc. (Jul. 13, 2006); 1 page; originally downloaded from http://www.vcsy.com/press/releases.php?year=2006&month=07&day=13&num=00.*

"A Programming Language for Mechanical Translation" by Victor H. Yngve (Jul. 1958); pp. 25-41 of "Mechanical Translation, vol. 5, No. 1" (17 pages total); originally downloaded from http://ftsp.mercubuana.ac.id/34/MT-1958-Yngve.pdf.*

"Understanding trusted computing: will its benefits outweigh its drawbacks?" by E.W. Felten (May 2003); 3 pages; originally downloaded from http://ieeexplore.ieee.org/stamp/stamp.jsp?tp=&arnumber=1203224.*

"What is Post-Processing?" by ICAM Technologies (Apr. 28, 2005); 2 pages; converted to PDF from http://www.icam.com/html/products/whatis/what_is_post.php via http://www.archive.org/.*

"Radkersburger Selects UGS' New NX CAM Express" by Siemens (Aug. 14, 2006); http://www.plm.automation.siemens.com/en_us/about_us/newsroom/press/press_release.cfm?Component=25324&ComponentTemplate=822.*

"An intelligent NC program processor for CNC system of machine tool" (Available online Jun. 9, 2006) by Yadong Liu et al.; 8 pages; converted to PDF originally from http://www.sciencedirect.com/science/article/pii/S073658450600038X.*

"Catenation and Operand Specialization for TCL Virtual Machine Performance" (2004) by Benjamin Vitale; 107 pages; originally downloaded from http://www.eecg.toronto.edu/~tsa/theses/benjamin_vitale.pdf.*

"AZ-post Configuration Guide" (Oct. 27, 2005) by NCData Services; 35 pages; originally downloaded from http://www.ncdataservices.com/docs/AZPost_Configuration_Guide.pdf.*

Wikipedia, Transposition Cipher, Mar. 9, 2007, http://en.wikipedia.org/w/index.php?title=Transposition_cipher&oldid=113845562, XP55006730; Others; 2007; (5 pages).

Wikipedia, Caesar Cipher, Feb. 22, 2007, http://en.wikipedia.org/w/index.php?title=Caesar_cipher&oldid=110029046, XP55006728; Others; 2007; (5 pages).

* cited by examiner

SYSTEM AND METHOD FOR PROTECTING NUMERICAL CONTROL CODES

CROSS-REFERENCE TO RELATED APPLICATIONS

This Application claims priority to pending Provisional U.S. Application Ser. No. 60/896,709, filed on Mar. 23, 2007, which application is incorporated herein by reference in its entirety. This application is related to U.S. Ser. No. 12/052,127, entitled "SYSTEM AND METHOD FOR TEXT-BASED ENCRYPTION", filed on Mar. 20, 2008, which application is incorporated by reference here.

TECHNICAL FIELD

The presently preferred embodiment of the innovations described herein relate generally to software applications. More specifically, the presently preferred embodiment relates to a system and method for text-based encryption scheme for numerical control code protection.

BACKGROUND

Computer aided manufacturing (CAM) applications commonly provide the ability to generate tool paths in order to manufacture parts. Generally a user of such a CAM application cannot just send an unmodified tool path to a machine and start cutting because there are many different types of machines. Each type of machine has unique hardware capabilities and requirements; for instance, it can have a vertical or horizontal spindle, it can cut while moving several axes simultaneously, etc.

Further, each machine is controlled by a computer (i.e., a controller). This is referred to as a numerically controlled (NC) machine. The controller accepts a tool path file and directs tool motion and other machine activity (e.g., turning the coolant or air on and off). Just as each type of machine has unique hardware characteristics, controllers also differ in software characteristics. For instance, most controllers require that the instruction for turning the coolant on, for example, be given in a particular code. Some controllers also restrict the number of codes that are allowed in one line of output. The above mentioned information is not in the initial tool path definition.

Therefore, the tool path must be modified to suit the unique parameters of each different machine/controller combination in a data transformation and formatting process called postprocessing. Post processors are the software elements that are used during postprocessing to generate the output (NC codes) sequenced and formatted properly to be accepted and understood by the machine/controller of interest. A CAD application, like NX® offered for commercial sale by Siemens Product Lifecycle Management Software, Inc., can use the TCL scripting language as the medium to deliver one of the post processor elements called an event handler file that is written in the form of readable source code in text-readable format. TCL enables the postprocessor programmer to encapsulate logical manipulation and computation with the raw tool path data in order to produce desired numerical control codes for the controller and related machine. The textual form of delivery for software applications leaves the source code of the script file viewable with any text reader, and conversely any intellectual property contained within the scripts is easily viewable. Providers of the post processors also suffer from not being able to license and restrict the use of individual post processor to only the authorized users.

To solve these problems, commercial software applications will sometimes compile the deliverable source code or supporting data files into binary images. Although this approach provides good protection, it requires the deliverable files be prepared individually for each computer platform because compiling object code from source code is typically platform dependent.

What is needed is a system and method for text-based source code encryption that is platform independent to protect postprocessors and/or supporting data files while imposing license control.

SUMMARY

To achieve the foregoing, and in accordance with the purpose of the presently preferred embodiment as described herein, the present application provides a computer implemented method for protecting numerical control codes, comprising decrypting an encrypted text file that defines how an event for a tool path data set is processed; processing said decrypted text file to obtain a set of instructions; formatting said set of instructions according to a definition file; and outputting said set of formatted instructions; whereby postprocessed machine controls are written. The method, wherein said encrypted text file is written in an interpretive language. The method, wherein said encrypted text file contains license information.

An advantage of the presently preferred embodiment is to provide a system, comprising a postprocessed machine control instruction set processed from an encrypted instruction text file; a controller that reads said postprocessed machine control instruction set; and a machine tool that operates according said controller. The system, wherein said system is in a virtual environment. The system, wherein said encrypted instruction text file has license control information. The system, wherein said encrypted instruction text file is created by a third party.

Another advantage of the presently preferred embodiment is to provide a computer-program product tangibly embodied in a machine readable medium to perform a method for protecting numerical control codes, comprising instructions operable to cause a computer to decrypt an encrypted text file that defines how an event for a tool path data set is processed; process said decrypted text file to obtain a set of instructions; format said set of instructions according to a definition file; and output said set of formatted instructions; whereby postprocessed machine controls are written. The computer-program product, wherein said encrypted text file is written in an interpretive language. The computer-program product, wherein said encrypted text file contains license information.

And another advantage of the presently preferred embodiment is to provide a data processing system having at least a processor and accessible memory to implement a method for protecting numerical control codes, comprising means for decrypting an encrypted text file that defines how an event for a tool path data set is processed; means for process said decrypted text file to obtain a set of instructions; means for format said set of instructions according to a definition file; and means for output said set of formatted instructions.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 4:
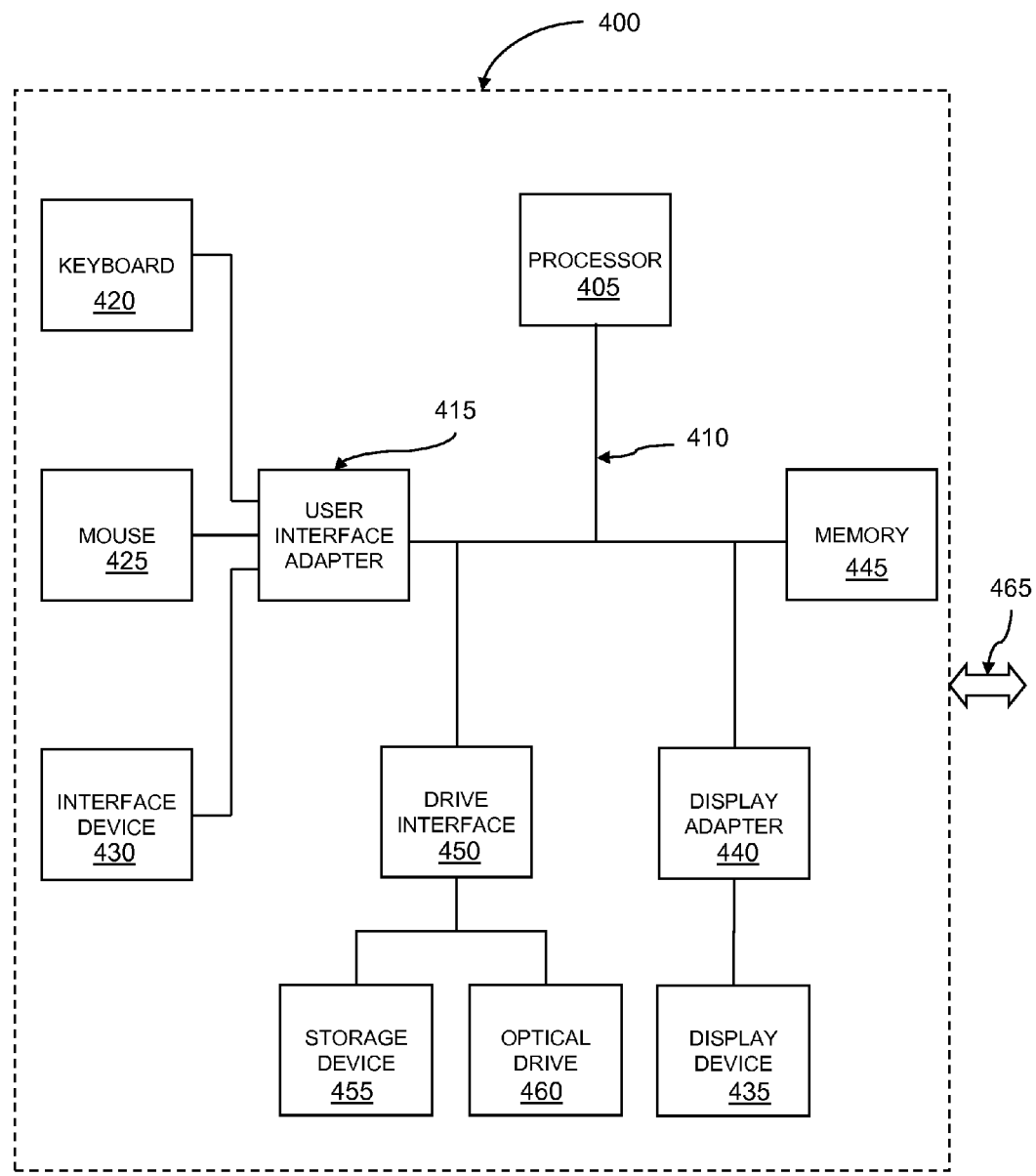
FIG. 4 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method for protecting numerical control codes that is platform independent. Now therefore, in accordance with the presently preferred embodiment, an operating system executes on a computer, such as a general-purpose personal computer. FIG. 4 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation implement particular abstract data types. The presently preferred embodiment may be performed in any of a variety of known computing environments.

Referring to FIG. 4, an exemplary system for implementing the presently preferred embodiment includes a general-purpose computing device in the form of a computer 400, such as a desktop or laptop computer, including a plurality of related peripheral devices (not depicted). The computer 400 includes a microprocessor 405 and a bus 410 employed to connect and enable communication between the microprocessor 405 and a plurality of components of the computer 400 in accordance with known techniques. The bus 410 may be any of several types of bus structures including a memory bus or memory controller, a peripheral bus, and a local bus using any of a variety of bus architectures. The computer 400 typically includes a user interface adapter 415, which connects the microprocessor 405 via the bus 410 to one or more interface devices, such as a keyboard 420, mouse 425, and/or other interface devices 430, which can be any user interface device, such as a touch sensitive screen, digitized pen entry pad, etc. The bus 410 also connects a display device 435, such as an LCD screen or monitor, to the microprocessor 405 via a display adapter 440. The bus 410 also connects the microprocessor 405 to a memory 445, which can include ROM, RAM, etc.

The computer 400 further includes a drive interface 450 that couples at least one storage device 455 and/or at least one optical drive 460 to the bus. The storage device 455 can include a hard disk drive, not shown, for reading and writing to a disk, or a magnetic disk drive, not shown, for reading from or writing to a removable magnetic disk drive. Likewise the optical drive 460 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 400.

The computer 400 can communicate via a communications channel 465 with other computers or networks of computers. The computer 400 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 445 of the computer 400. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

System

Figure 1:
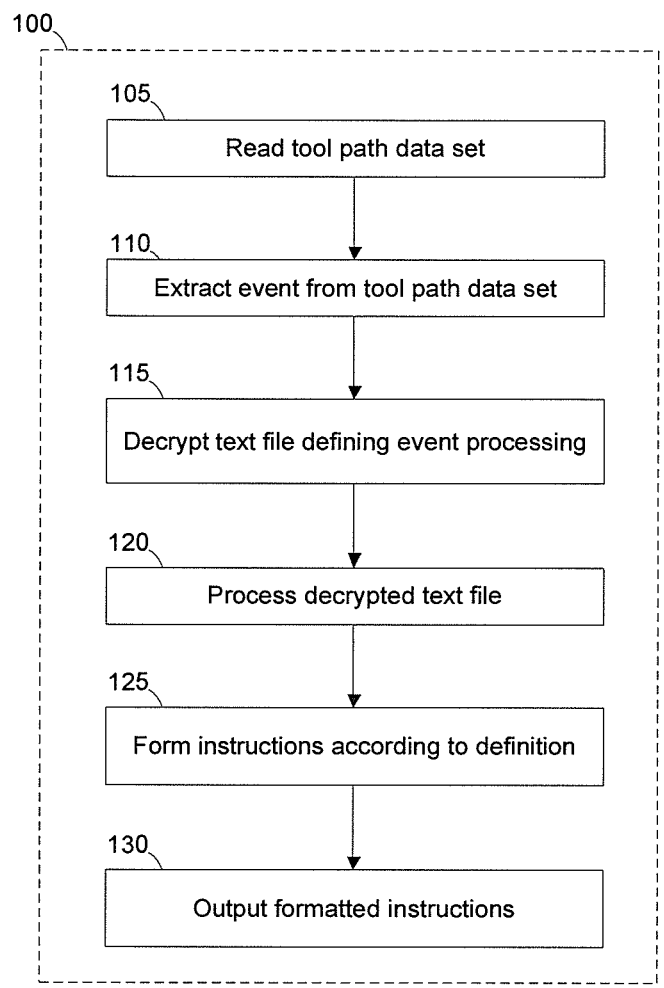
FIG. 1 is a logic flow diagram of the method employed by the presently preferred embodiment.

FIG. 1 is a logic flow diagram of the method employed by the presently preferred embodiment. Referring to FIG. 1, the presently preferred embodiment discloses a method for protecting numerical control codes 100 by beginning with reading a tool path data set (Step 105). Next, extract an event from the tool path data set (Step 110). Then, decrypt an encrypted text file that defines how the event is processed (Step 115). Continuing, process the decrypted text file to obtain a set of instructions (Step 120). And then, form the set of instructions according to a definition file (Step 125). Lastly, output the set of formatted instructions so that postprocessed machine controls are written (Step 130).

Figure 2:
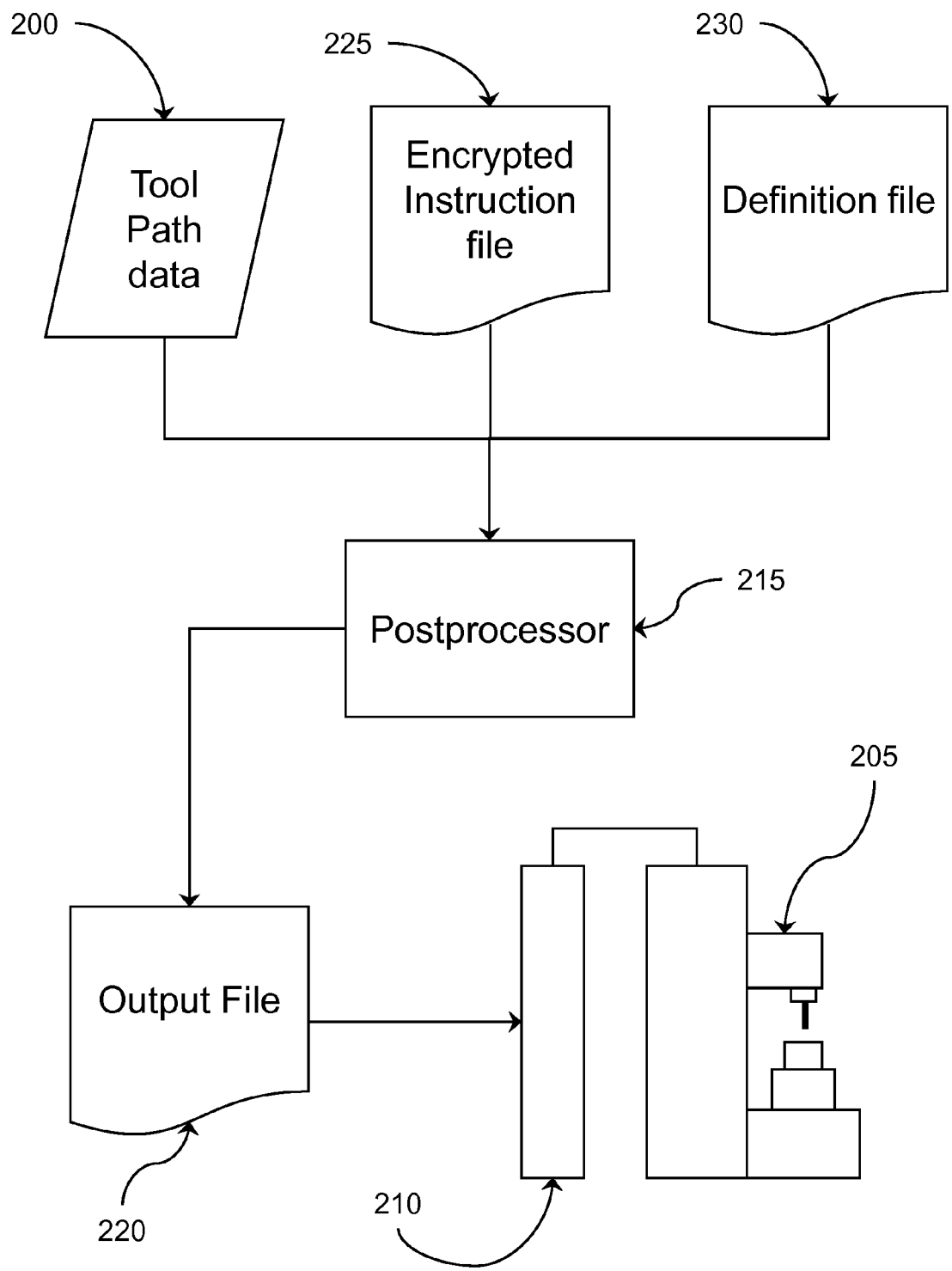
FIG. 2 illustrates a numerical control system.

FIG. 2 illustrates a numerical control system. Referring to FIG. 2, an event file 200 contains tool path events or data, which could have been created by a computer aided design and manufacturing application (CAD/CAM), for example. Given the unique nature of a machine tool 205 and a corresponding controller 210, event files 200 cannot be loaded directly into the corresponding controller 210 and expect the machine tool 205 to behave appropriately. To transform and format the data of the tool path events into instructions understood and accepted by the machine tool 205 and corresponding controller 210, the data of the event file 200 must be modified in a postprocessor 215 that creates a postprocessed tool path in an output file 220. An input to the postprocessor is an encrypted instruction file 225 that is a text file written in the interpretive language, for example, like TCL, containing a set of instructions dictating how each event is to be processed. Put another way, the events are processed into machine instructions formatted by a definition file 230 into the output file 220. The definition file 230 contains static information related to the machine tool 205 and the corresponding controller 210, and is dependant upon them, respectively. The postprocessor 215 then outputs the output file 220 that contains the postprocessed NC instructions that will be read and executed by the controller 210 that controls the movement of the machine tool 205.

Protection of Numerical Control Codes

Figure 3:
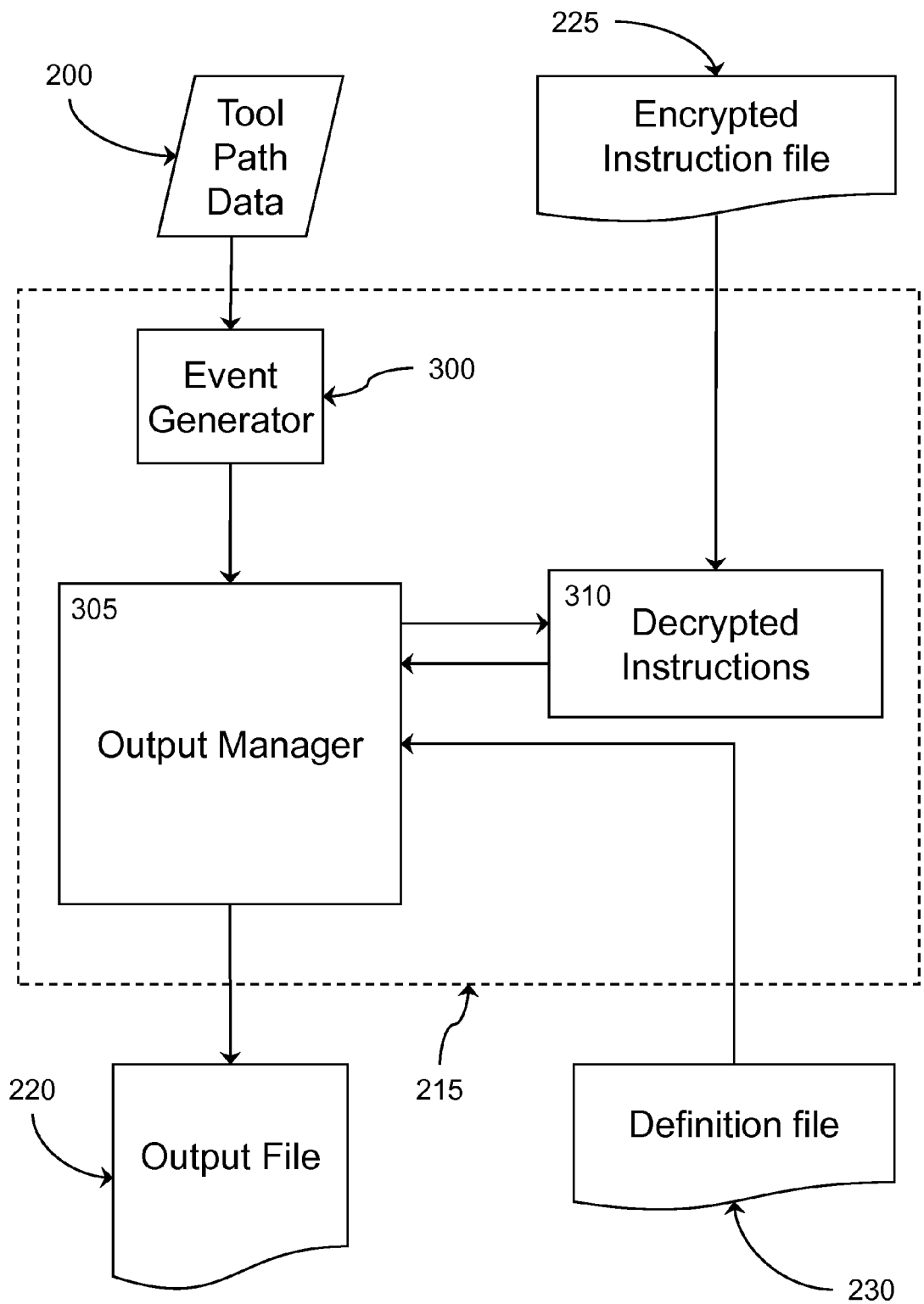
FIG. 3 illustrates a more detailed perspective of the presently preferred embodiment.

FIG. 3 illustrates a more detailed perspective of the presently preferred embodiment. Referring to FIG. 3, in the postprocessor 215, an event generator 300 reads tool path data from the event file 200. The event generator extracts the tool path data and passes it to an output manager 305 as events and parameters. Each event would cause some specific action at the machine tool 205 when it is executed. The information stored in the parameters associated with the event is used to further define the specific action. For example, a linear move event will cause the machine tool 205 to move the tool along a straight line to a position specified by the information stored in the parameters $\{x,y,z\}$. This sample information is then passed from the event generator 300 to the output manager 305. A set of translation instructions define how the tool path data is to be processed and how each event is to be executed at the machine tool 205. The set of translation instructions are written in the interpretive language, such as TCL, and are located in the encrypted text file 225 that is developed for each machine tool 205 and controller 210 combination. At runtime, the encrypted text file 225 is preferably read by a decryption instructions procedure 310 (or a decryptor for example, not depicted) to decrypt the encrypted text file 225 utilizing the encryption methods described below, but in an intuitive reverse order as is understood in the art.

Step 1

A text file titled sample.tcl contains a single line command, "puts HelloWorld" (without quotes). This single line command will print HelloWorld to the display when executed by the interpreter of Tcl scripting language. The user desires to encrypt sample.tcl so that an unintended viewer (or person) does not ascertain the contents of the text file with the help of any common text editor or other method to obtain information from a text file. To begin the encryption process described in the presently preferred embodiment, the single line command is re-sequenced to look like, "dlroWolleH stup" (without the quotes).

Step 2

Next, each character of the re-sequenced line is converted to its base representation of an ASCII decimal (or octal) equivalent and offset by subtracting it from the decimal 158 (or octal 236). It is understood that any base number system can be used, such as binary. For example, in "dlroWolleH", the character "d" is decimal 100, which is subtracted from decimal 158 to result in decimal 58 that is the colon character, ":". When considering the example command line, the resulting decimal equivalent is: 100 108 114 111 87 111 108 108 101 72 115 116 117 112, which is then offset to decimal 58 50 44 47 71 47 50 50 57 86 43 42 41 46. The ASCII equivalent of this offset decimal string, without the quotes, creates a translated string as ":2,/G/229V+*)." in this example.

A pseudo random number generator is used to determine a random number of characters, described in more detail below, according to the following formula:

$$RN_t = |(c1*RN_{(t-1)} + c2) \text{ MOD } c3| \quad \text{(Equation 1)}$$

where $t = \{1, 2, \ldots, n\}$, c1, c2, and c3 are integer coefficients to produce random numbers with sufficient randomness. Through experimentation, any set of coefficients can be employed; provided a sufficient fluctuation can be produced. For example, preferably 3, 11, and 17, can be used in place of c1, c2, and c3, respectively. RNO, a seed number, is determined by a clock click number fetched from the system clock, at the time of encryption. The clock click number can vary in precision from seconds to nanoseconds. For example, utilizing NT Time Epoch, the time-date of Dec. 8, 2004 at 21:56:03.9843750 GMT will produce 127470165639843750, which is then used to calculate RNO. Utilizing Eq. 1 for $RN_t$ where $t = \{1, 2, \ldots, n\}$:

$$RN_0 = 127470165639843750 \text{ (the seed value as determined above)}$$

$$RN_1 = |(3*RN_0 + 11) \text{ MOD } 17|$$
$$= |(3*127470165639843750 + 11) \text{ MOD } 17$$
$$= |382,410,496,919,531,261 \text{ MOD } 17)$$

$$RN_1 = 10$$

The ASCII decimal code for a random character is determined by adding decimal value to the random number generated by the formula above. Any number greater than 126 will be decremented by 126 and a number less than 32 will be incremented by 32; then it is translated into an ASCII character. Each digit of the seed RNO, a printable numeral of the ASCII character set, is offset by subtracting its ASCII code from the decimal 158 then converted to an equivalent ASCII character, e.g., RNO=>mm. A fixed number of random characters (also generated with the pseudo random number generator and the above mentioned rule) are then padded before and after the translated seed number (key). This is to further disguise the key. The string containing the encrypted seed number is then outputted to the beginning of a resultant file that will contain the encrypted text, for example, titled sample_tcl.txt.

Step 4

Having created the seed, $RN_0$, a random number of random characters are inserted after each character in the translated string, ":2,/G/229V+*).", from above. For example, knowing that RN1 is 10, 10 random characters are inserted, where ^ is used in place of a random character in this example for simplicity, to produce:

:^^^^^^^^^^2,/G/229V+*).

The pseudo-random number generator is run again for $RN_2$ with Eq. 1, where $RN_2 = |(3*RN_1 + 11) \text{ MOD } 17| = |(3*10+11) \text{ MOD } 17| = |41 \text{ MOD } 17| = 7$. Now 7 random characters are inserted after the next character in the translated string to produce:

:^^^^^^^^^^2^^^^^^^,/G/229V+*).

The process of inserting random characters is iterative to form a new line. A random number of random characters calculated in the same manner discussed is then padded to the start and the end of the new line and is then outputted to the resultant file.

Step 5

The resultant file is now encrypted with the embedded seed and is viewable by use of any method to view a text file, however the details are not discernable without knowledge of the seed, which is in this case also referred to as the key. At runtime, the application will search for the sample_tcl.txt file to decrypt utilizing the seed to produce the original line of "puts HelloWorld" to display "HelloWorld" in the application. The decrypt instructions procedure 310 returns the decrypted processed output to the output manager 305. The output manager 305 now applies the static data described in the definition file 230 about the machine tool 205 such as addresses for each of the variables so that each command line in the program changes the state of the machine tool 205 by changing the state of its addresses. The resultant output file 220 is of the proper form to program the machine tool 205 and corresponding controller 210 to perform the tasks defined by the tool path data in the event file 200.

CONCLUSION

From Step 1 through Step 5, the presently preferred embodiment has disclosed complete solution for protecting numerical control codes that involves tool path data postprocessed according to instructions in an encrypted text file and formatted according to the definition file. Furthermore, contained within the encrypted instruction file 225 is the ability to embed license information corresponding to its authorized use.

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments have been described. It will be understood that various modifications may be made without departing from the spirit and scope of the presently preferred embodiment, such as the use of other character encoding methodologies or the use of other random number generators, including pseudo-random number generators, computed or not. Also completed is the encrypted instruction file 225 that is supplied by third parties that want to maintain the secrecy of its information. Therefore, other implementations are within the scope of the following claims.

What is claimed is:

1. A computer implemented method for protecting numerical control codes, the method comprising:
decrypting, by one or more computers, an encrypted text file that defines how an event for a tool path data set is processed, wherein the encrypted text file includes an encrypted seed number that has a fixed number of first random characters padded before and after a translated seed number, and includes second random characters inserted after each character in a translated instruction string;
processing, by the one or more computers, said decrypted text file to obtain a set of instructions;
formatting, by the one or more computers, said set of instructions according to a definition file, wherein the definition file contains static information related to a machine tool and a corresponding controller for the machine tool; and
outputting, by the one or more computers, said set of formatted instructions, whereby postprocessed machine controls are written that can be executed by the controller.

2. The method of claim 1, wherein said encrypted text file is written in an interpretive language.

3. The method of claim 2, wherein the interpretive language is the TCL scripting language.

4. The method of claim 1, wherein said encrypted text file contains license information.

5. The method of claim 1, wherein formatting said set of instructions according to the definition file comprises:
formatting the set of instructions into a format useable by the controller to control the machine tool to process the event according to the tool path data.

6. The method of claim 1, wherein the encrypted text file includes a set of translation instructions developed for a particular machine tool and controller combination.

7. The method of claim 1, wherein the tool path data includes parameters that cause a machine tool to form a part.

8. The method of claim 1, wherein the translated seed number is produced using a first translation process and the translated instruction string is produced using a second translation process,
wherein the second random characters are based on the translated seed number,
wherein the first translation process includes converting a random seed number to an ASCII decimal code and translating the ASCII decimal code into an ASCII character, and
wherein the second translation process includes re-sequencing a plurality of text characters in each of a plurality of lines and translating a base representation for each of the text characters in each of the plurality of lines by an offset of a decimal value of 158 to produce the characters in the translated instruction string.

9. A system, comprising:
a postprocessed machine control instruction set processed from an encrypted instruction text file that defines how an event for a tool path data set is processed, and wherein the machine control instruction set is formatted according to a definition file, wherein the encrypted instruction text file includes an encrypted seed number that has a fixed number of first random characters padded before and after a translated seed number, and includes second random characters inserted after each character in a translated instruction string;
a controller for a machine tool that reads said postprocessed machine control instruction set, wherein the definition file contains static information related to the machine tool and the controller; and
a machine tool that operates according to said controller.

10. The system of claim 9, wherein said system is in a virtual environment.

11. The system of claim 9, wherein said encrypted instruction text file has license control information.

12. The system of claim 9, wherein said encrypted instruction text file is created by a third party.

13. The system of claim 9, wherein the translated seed number is produced using a first translation process and the translated instruction string is produced using a second translation process,
   wherein the second random characters are based on the translated seed number,
   wherein the first translation process includes converting a random seed number to an ASCII decimal code and translating the ASCII decimal code into an ASCII character, and
   wherein the second translation process includes re-sequencing a plurality of text characters in each of a plurality of lines and translating a base representation for each of the text characters in each of the plurality of lines by an offset of a decimal value of 158 to produce the characters in the translated instruction string.

14. A computer-program product tangibly embodied in a non-transitory machine readable medium to perform a method for protecting numerical control codes, the computer-program product comprising instructions operable to cause a computer to:
   decrypt an encrypted text file that defines how an event for a tool path data set is processed, wherein the encrypted text file includes an encrypted seed number that has a fixed number of first random characters padded before and after a translated seed number, and includes second random characters inserted after each character in a translated instruction string;
   process said decrypted text file to obtain a set of instructions;
   format said set of instructions according to a definition file, wherein the definition file contains static information related to a machine tool and a corresponding controller for the machine tool; and
   output said set of formatted instructions,
   whereby postprocessed machine controls are written that can be executed by the controller.

15. The computer-program product of claim 14, wherein said encrypted text file is written in an interpretive language.

16. The computer-program product of claim 14, wherein said encrypted text file contains license information.

17. The computer-program product of claim 14, wherein the translated seed number is produced using a first translation process and the translated instruction string is produced using a second translation process,
   wherein the second random characters are based on the translated seed number,
   wherein the first translation process includes converting a random seed number to an ASCII decimal code and translating the ASCII decimal code into an ASCII character, and
   wherein the second translation process includes re-sequencing a plurality of text characters in each of a plurality of lines and translating a base representation for each of the text characters in each of the plurality of lines by an offset of a decimal value of 158 to produce the characters in the translated instruction string.

18. A data processing system, comprising:
   a processor; and
   an accessible memory, the data processing system configured to
      decrypt an encrypted text file that defines how an event for a tool path data set is processed, wherein the encrypted text file includes an encrypted seed number that has a fixed number of first random characters padded before and after a translated seed number, and includes second random characters inserted after each character in a translated instruction string,
      process said decrypted text file to obtain a set of instructions,
      format said set of instructions according to a definition file, wherein the definition file contains static information related to a machine tool and a corresponding controller for the machine tool, and
      output said set of formatted instructions that can be executed by the controller.

19. The data processing system of claim 18, wherein the translated seed number is produced using a first translation process and the translated instruction string is produced using a second translation process,
   wherein the second random characters are based on the translated seed number,
   wherein the first translation process includes converting a random seed number to an ASCII decimal code and translating the ASCII decimal code into an ASCII character, and
   wherein the second translation process includes re-sequencing a plurality of text characters in each of a plurality of lines and translating a base representation for each of the text characters in each of the plurality of lines by an offset of a decimal value of 158 to produce the characters in the translated instruction string.

* * * * *